(12) United States Patent
Styles et al.

(10) Patent No.: US 8,676,821 B2
(45) Date of Patent: Mar. 18, 2014

(54) SUMMARY FILTER TRANSFORMATION

(75) Inventors: Michael E. Styles, Osgoode (CA); Marius Cosma, Kanata (CA)

(73) Assignee: SAP AG, Walldorf (DE)

( * ) Notice: Subject to any disclaimer, the term of this patent is extended or adjusted under 35 U.S.C. 154(b) by 2111 days.

(21) Appl. No.: 10/856,305

(22) Filed: May 27, 2004

(65) Prior Publication Data

US 2005/0038782 A1 Feb. 17, 2005

(30) Foreign Application Priority Data

May 27, 2003 (CA) ..................................... 2429910

(51) Int. Cl.
*G06F 17/30* (2006.01)
*G06F 15/16* (2006.01)

(52) U.S. Cl.
USPC ........................................................... 707/756

(58) Field of Classification Search
USPC ........................................................... 707/756
See application file for complete search history.

(56) References Cited

U.S. PATENT DOCUMENTS

| | | | |
|---|---|---|---|
| 5,963,936 A | 10/1999 | Cochrane et al. | |
| 6,009,432 A | 12/1999 | Tarin | |
| 6,128,612 A | 10/2000 | Brereton et al. | |
| 6,289,334 B1 | 9/2001 | Reiner et al. | |
| 6,339,775 B1 | 1/2002 | Zamanian et al. | |
| 6,341,281 B1 | 1/2002 | MacNicol et al. | |
| 6,345,272 B1 | 2/2002 | Witkowski et al. | |
| 6,370,524 B1 | 4/2002 | Witkowski | |
| 6,370,541 B1 | 4/2002 | Chou et al. | |
| 6,438,537 B1 | 8/2002 | Netz et al. | |
| 6,460,027 B1 | 10/2002 | Cochrane et al. | |
| 6,519,604 B1 | 2/2003 | Acharya et al. | |
| 6,567,802 B1 | 5/2003 | Popa et al. | |
| 6,574,623 B1 * | 6/2003 | Leung et al. ....................... | 707/5 |
| 6,609,123 B1 | 8/2003 | Cazemier et al. | |
| 6,611,838 B1 | 8/2003 | Ignat et al. | |
| 6,629,094 B1 | 9/2003 | Colby et al. | |
| 6,651,055 B1 | 11/2003 | Kilmer et al. | |
| 6,684,204 B1 | 1/2004 | Lal | |
| 6,714,928 B1 | 3/2004 | Calow | |
| 6,766,330 B1 | 7/2004 | Chen et al. | |
| 6,847,962 B1 | 1/2005 | Cochrane et al. | |
| 6,934,712 B2 | 8/2005 | Kiernan et al. | |
| 7,110,999 B2 | 9/2006 | Colby et al. | |

(Continued)

FOREIGN PATENT DOCUMENTS

| | | |
|---|---|---|
| EP | 1081611 A2 | 3/2001 |
| WO | WO 03/012698 | 2/2003 |
| WO | WO 03/038662 A1 | 5/2003 |

OTHER PUBLICATIONS

Pirahesh et al, A Rule Engine for Query Transformation in Starburst and IBM DB2 C/S DBMS, Published Apr. 1997, pp. 391-400.*

(Continued)

*Primary Examiner* — Alex Gofman
(74) *Attorney, Agent, or Firm* — Sterne, Kessler, Goldstein & Fox P.L.L.C.

(57) ABSTRACT

A mechanism for summary filter transformation is provided. The mechanism comprises a summary filter analysis module for analyzing a multidimensional query that is not supported by a target database system, and a summary filter transformation module for transforming the multidimensional query into a semantically equivalent query that is supported by the target database system.

18 Claims, 3 Drawing Sheets

(56) References Cited

U.S. PATENT DOCUMENTS

| | | |
|---|---|---|
| 7,120,645 B2 | 10/2006 | Manikutty et al. |
| 7,133,865 B1 | 11/2006 | Pedersen et al. |
| 7,275,056 B2 | 9/2007 | Cheng et al. |
| 7,315,849 B2 | 1/2008 | Bakalash et al. |
| 7,318,058 B2 | 1/2008 | Styles |
| 7,428,532 B2 | 9/2008 | Styles |
| 7,769,769 B2 | 8/2010 | Rasmussen |
| 7,917,463 B2 | 3/2011 | Dagum et al. |
| 2001/0037345 A1 | 11/2001 | Kiernan et al. |
| 2002/0059203 A1 | 5/2002 | Witkowski et al. |
| 2002/0087524 A1 | 7/2002 | Leathers |
| 2002/0107840 A1 | 8/2002 | Rishe |
| 2002/0188600 A1 | 12/2002 | Lindsay et al. |
| 2003/0066051 A1 | 4/2003 | Karr et al. |
| 2003/0088558 A1 | 5/2003 | Zaharioudakis et al. |
| 2003/0101169 A1 | 5/2003 | Bhatt et al. |
| 2003/0115194 A1 | 6/2003 | Pitts et al. |
| 2004/0133567 A1 | 7/2004 | Witkowski et al. |
| 2004/0181537 A1 | 9/2004 | Chawla et al. |
| 2005/0010569 A1 | 1/2005 | Styles |
| 2005/0010570 A1 | 1/2005 | Styles |
| 2005/0015369 A1 | 1/2005 | Styles et al. |

OTHER PUBLICATIONS

Microsoft Computer Dictionary, Fifth Edition, (Published May 2002), [Retrieved on Aug. 12, 2010] Retrieved from the Internet: http://proquest.safaribooksonline.com/0735614954; pp. 1-2.*

EP 04 01 2635, European Search Report.

Schwarz H. et al., Improving the Processing of Decision Support Queries: The Case for a DSS Optimizer, Jul. 16, 2001.

Zemke F. et al., "Introduction to OLAP Functions", Apr. 12, 1999.

Winter R., "SQL-99's New OLAP Functions", Jan. 20, 2000.

Chiou A.S. et al., "Optimization for Queries With Holistic Functions", Apr. 18, 2001.

"European Search Report", Aug. 17, 2005 for Application No. EP 04012614, 4 pages.

"European Search Report", Jul. 28, 2005 for Application No. EP 04012615, 6 pages.

"European Search Report", Jul. 28, 2005 for Application No. EP04012613, 2 pages.

"European Search Report", EP04076566, Aug. 8, 2005, 4 pages.

"Oracle Technology Network—Discussion Forums", Online, http://forums.oracle.com/forums/thread.jspa?messageIDS=343362񓵂, XP-002337527, retrieved Jul. 22, 2005.

Johnson, Theodore et al., "Extending Complex Ad-Hoc OLAP", Association for Computing Machinery, Proceedings of the 8th International Conference on Information Knowledge Management, CIKM '99, Kansas City, Missouri, Nov. 2-6, 1999, ACM CIKM International Conference on Information and Knowledge Management, New York, Nov. 1999, pp. 170-179.

Lee, Sang-Won, "SQL/OLAP", PowerPoint presentation, http://vldb.skku.ac.kr/vldb/talk/sql-olap.ppt, Jul. 12, 2001, 32 pages.

Ross, Kenneth a. et al., "Complex Aggregation at Multiple Granularities", Lecture Notes in Computer Science, vol. 1377, 1998, pp. 263-277.

Schwarz, Holger et al., "Improving the Processing of Decision Support Queries: Strategies for a DSS Optimizer", University Stuttgart, Technical Report TR-2001-02, Germany, May 2001, pp. 1-20.

Sordi, J.J., "The Query Management Facility", IBM Systems Journal, 1984, vol. 23, No. 2, pp. 126-150.

Liebling, Michael, "Matlab vs. IDL", Biomedical Imaging Group, Feb. 28, 2002, 5 pages.

* cited by examiner

SUMMARY FILTER TRANSFORMATION

FIELD OF THE INVENTION

The invention relates generally to data access middleware, and in particular to a system and method of summary filter transformation.

BACKGROUND OF THE INVENTION

A typical data access environment has a multi-tier architecture. For description purposes, it can be separated into three distinct tiers:
Web server
Applications
Data
The tiers are based on business function, and are typically separated by firewalls. Client software, such as a browser or a report-authoring tool, sits above the tiers.

The web server contains a firewall and one or more gateways. All web communication is performed through a gateway. A gateway is responsible for passing on requests to the application server, in tier 2, for execution.

The applications tier contains one or more application servers. The application server runs requests, such as reports and queries that are forwarded by a gateway running on the web server. Typically, one of the components of the applications tier is a query engine, which is data access middleware that provides universal data access to a variety of heterogeneous database systems. The query engine formulates queries (typically SQL) and passes them on to the data tier, through a native database API (such as ODBC) for execution.

The data tier contains database management systems (DBMS), which manage raw data stored in a database. Examples of such systems include Oracle, DB2, and Microsoft SQL Server.

Although a multi-tier architecture can be configured in several different ways, a typical configuration places each tier on a separate computer (server). A database server is typically a "high end" server, and thus can process queries at a relatively fast speed. An application server cannot generally process queries as quickly as a database server.

In order to solve many business questions, a query engine may generate SQL queries that utilize The SQL/OLAP technology introduced in the SQL-99 standard. However, many database systems do not support this technology. Thus, the SQL queries would have to be performed on the report server that is generally slower than the database server. It is desirable to have as much processing performed on the database server.

There is a need to prevent or reduce the amount of local (application server) processing required to process a summary filter.

One way of overcoming this problem is for the query engine to generate a basic query to retrieve the data required to process the filter and all post-filter aggregates. Unfortunately, this solution requires processing time on the report server. It is desirable to have a way of transferring the SQL queries to the database server with minimal processing on the report server.

SUMMARY OF THE INVENTION

It is an object of the present invention to provide a method of summary filter transformation in a database system that does not support SQL-99 standard.

In accordance with an embodiment of the present invention, there is provided a system for summary filter transformation. The system comprises a summary filter analysis module for analysing a multidimensional query that is not supported by a target database system, and a summary filter transformation module for transforming the multidimensional query into a semantically equivalent query that is supported by the target database system.

In accordance with another embodiment of the present invention, there is provided a method of summary filter transformation. The method comprises the steps of analysing a multidimensional query that is not supported by a target database system, and transforming the multidimensional query into a semantically equivalent query that is supported by the target database system.

In accordance with an embodiment of the present invention, there is provided a method of summary filter transformation. The method comprises the steps of analysing a summary filter transformation to determine an overall filter grouping level, analysing a transformation select list to determine if a transformation is to be performed, creating a derived table, traversing the transformation select list to move PRE-FILTER aggregates and aggregates computed at the filter grouping level into the derived table, and extracting and moving aggregates from the summary filter into a derived table select list.

In accordance with an embodiment of the present invention, there is provided a computer data signal embodied in a carrier wave and representing sequences of instructions which, when executed by a processor, cause the processor to perform a method of summary filter transformation. The method comprises the steps of analysing a multidimensional query that is not supported by a target database system, and transforming the multidimensional query into a semantically equivalent query that is supported by the target database system.

In accordance with an embodiment of the present invention, there is provided a computer-readable medium having computer readable code embodied therein for use in the execution in a computer of a method of summary filter transformation. The method comprises the steps of analysing a multidimensional query that is not supported by a target database system, and transforming the multidimensional query into a semantically equivalent query that is supported by the target database system.

In accordance with an embodiment of the present invention, there is provided a computer program product for use in the execution in a computer of a group query transformation system for summary filter transformation. The computer program product comprises a summary filter analysis module for analysing a multidimensional query that is not supported by a target database system, and a summary filter transformation module for transforming the multidimensional query into a semantically equivalent query that is supported by the target database system.

DETAILED DESCRIPTION OF THE PREFERRED EMBODIMENTS

Figure 1:
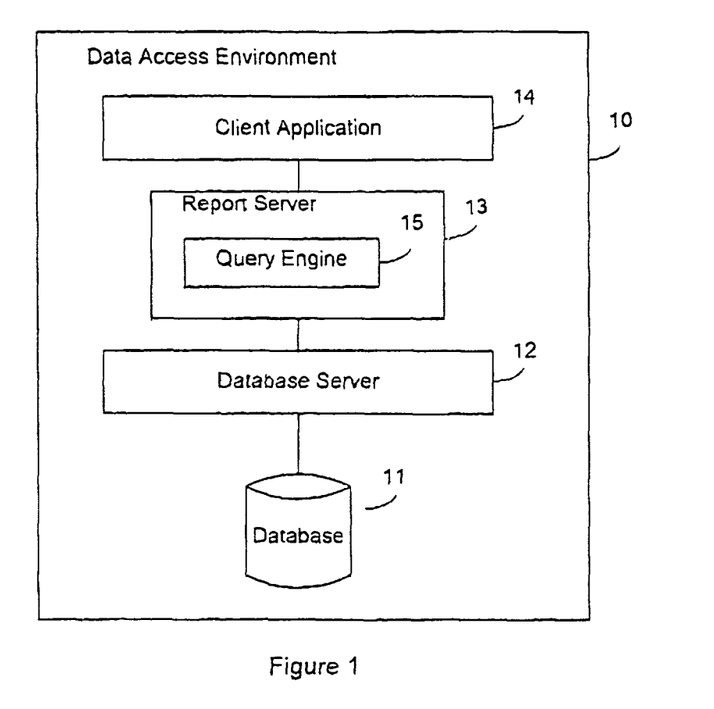
FIG. 1 shows a typical data access environment.

FIG. 1 shows a typical data access environment 10 for processing data. Typically, data is stored in a database 11. A DBMS running on a database server 12 accesses the raw data stored in the database 11. A query engine 15, running on a report server (or application server) 13 is used to generate reports on the raw data and instruct the DBMS on the database server 12 to obtain information pertaining to the raw data in the database 11. The query engine 15 provides universal data access to a variety of heterogeneous database systems. An end user uses a client application 14, running on a client workstation, to facilitate application server 13 operations.

In order to solve many business questions, a query engine 15 generates SQL queries that utilize the SQL/OLAP (Online Analytical Programming) technology introduced in the SQL-99 standard. These SQL queries include SQL/OLAP functions (windowed aggregates). However, many database systems 12 do nor support this technology. In order to prevent or reduce the amount of local (application server) processing required to process these types of queries, the query engine 15 attempts to generate semantically equivalent queries that can be processed on the database server 12 by the target database system. These semantically equivalent queries include standard aggregate functions and the GROUP BY operator.

Figure 2:
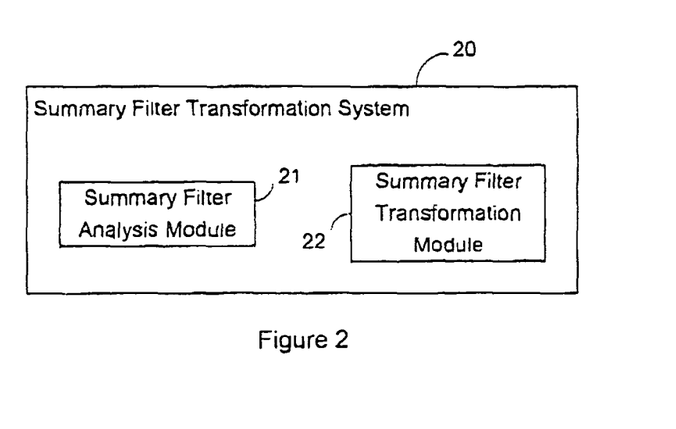
FIG. 2 shows a summary filter transformation system, in accordance with an embodiment of the present invention.

FIG. 2 shows a summary filter transformation system 20, in accordance with an embodiment of the present invention. The summary filter transformation system 20 comprises a summary filter analysis module 21 for analysing SQL/OLAP queries that are not supported by a target database system, and a summary filter transformation module 22 for transforming the SQL/OLAP queries into semantically equivalent queries that are supported by the target database system.

The summary filter transformation system 20 is implemented as a sub-system of the query engine 15 in the data access environment 10. This transformation 20 may generate queries that can be processed in their entirety on the database server 12, or queries that require processing on both the application server 13 and the database server 12.

Advantageously, the summary filter transformation system 20 reduces processing that might otherwise be required on an application server, thereby improving performance in many cases. Furthermore, the summary filter transformation system 20 takes advantage of functionality provided by a target database system.

There are two types of OLAP functions: framed functions and report functions. Framed OLAP functions contain a window frame specification (ROWS or RANGE) and an ORDER BY clause. Through window frames, capabilities such as cumulative (running) sums and moving averages can be supported. Report functions do not contain a window frame specification, and produce the same value for each row in a partition.

The SQL language is extended to include a FILTER clause that allows the specification of a summary filter (note that this clause is not part of the current SQL standard). Unlike the WHERE clause, which is applied before any OLAP functions in the select list are computed, the FILTER clause is applied before some OLAP functions are computed, and after others are computed.

The SQL language is also extended to include a PREFILTER keyword in an OLAP function specification to allow control of when the function is computed in the presence of a FILTER clause. Any OLAP function with PREFILTER specified is computed before the FILTER clause is applied, while all others are computed after.

The summary filter transformation generates a derived table and standard WHERE clause to apply the filter condition. Before describing this transformation, a couple of definitions are provided:

A group is a list of expressions over which an aggregate is computed, and is specified by either the FOR clause or AT clause, depending on the type of aggregate. For instance, given the aggregate SUM(QTY) OVER (PARTITION BY SNO, PNO), the group is (SNO, PNO).

Two groups C1 and C2 are compatible if C1 and C2 are identical, or C1 is a subset/superset of C2. For instance, the groups (SNO, PNO) and (SNO) are compatible, but the groups (SNO) and (PNO) are not.

Figure 3:
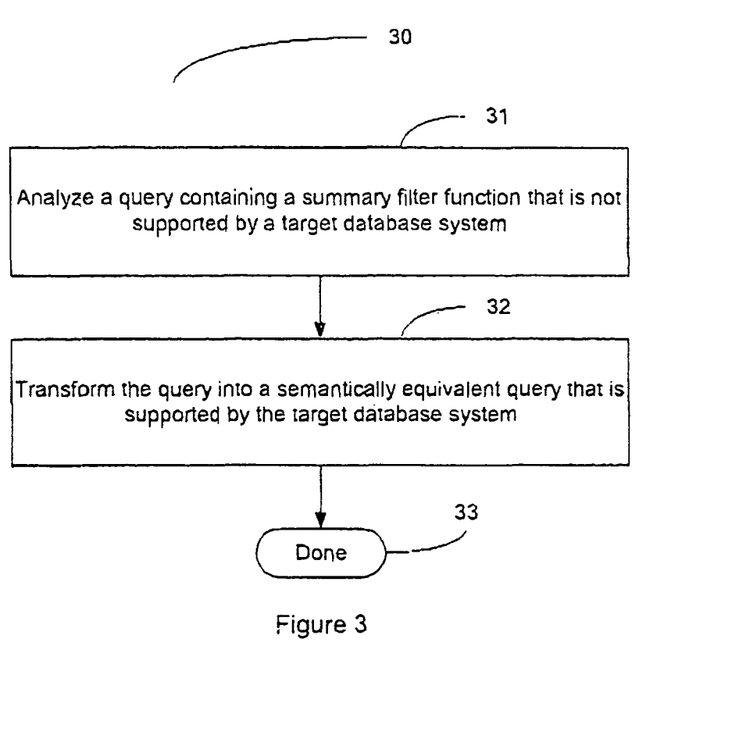
FIG. 3 shows in a flowchart an example of a method of summary filter transformation, in accordance with the summary filter transformation system.

FIG. 3 shows in a flowchart an example of a method of SQL group transformation (30), in accordance with an embodiment of the group query transformation system 20. The method (30) begins with analysing a query containing a group query that is not supported by a target database system (31). Next, the query is transformed into a semantically equivalent query that is supported by the target database system (32). The method (30) is done (33).

Figure 4:
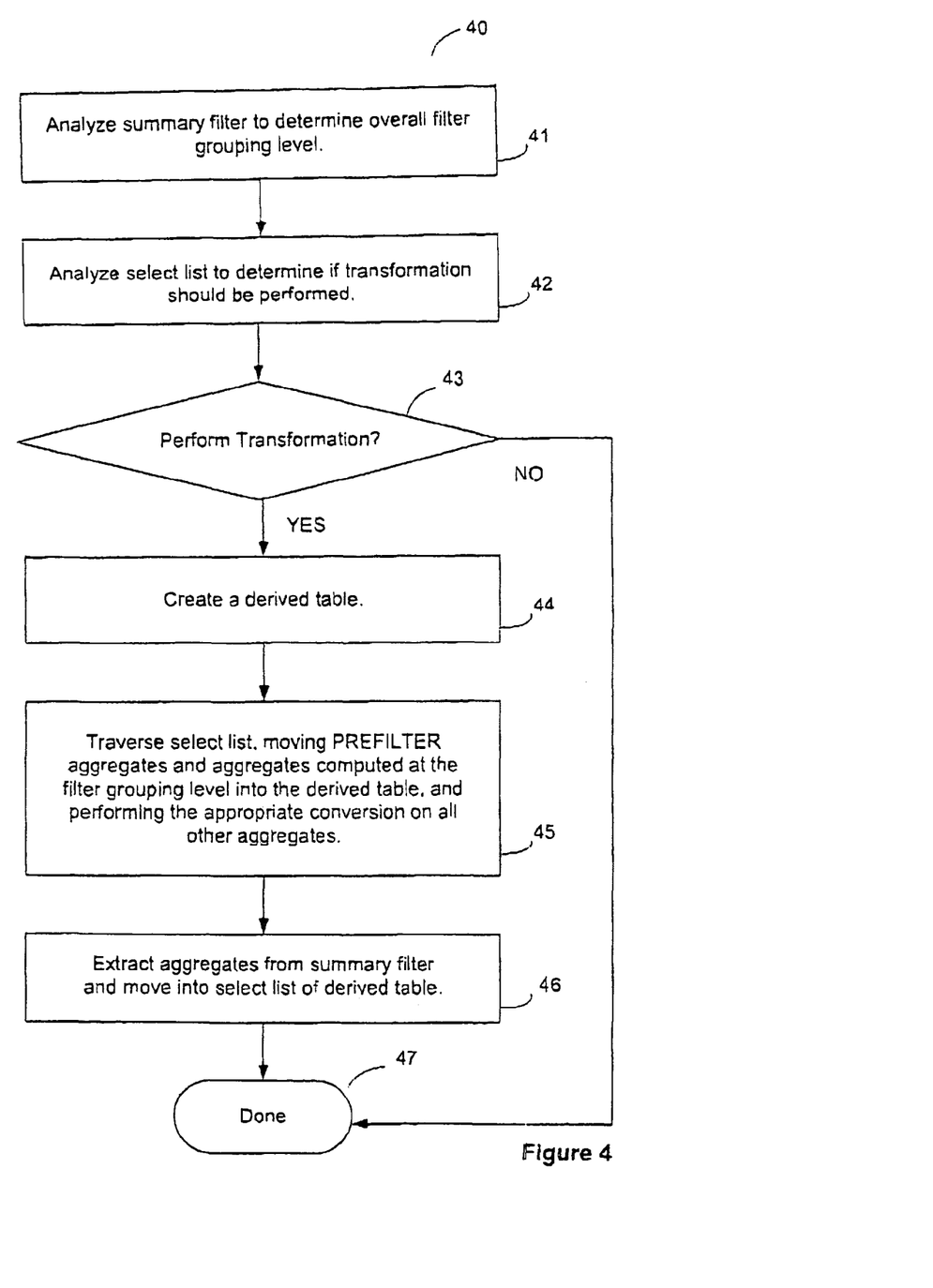
FIG. 4 shows in a flowchart another example of a method of summary filter transformation, in accordance with the summary filter transformation system.

FIG. 4 shows in a flowchart another example of a method of summary filter transformation (40), in accordance with the summary filter transformation system 20. The method (40) begins with analyzing a summary filter condition to determine an overall filter grouping level (41). Next, a select list is analyzed to determine how the transformation should be performed (42). The first step in performing the transformation (43) is to create a derived table (44). Next, the select list is traversed, moving PREFILTER aggregates and aggregates computed at the filter grouping level into the derived table, and performing the appropriate conversion on all other aggregates (45). Next, aggregates are extracted from the summary filter and moved into a select list of the derived table (46). The method (40) is now done (47).

As described above, the first step in performing the summary filter transformation (40) is to analyze the summary filter condition to determine an overall filter grouping level (if any) (41). Preferably, step (41) is accomplished by first enumerating all groups using the following rules:

A specific group is derived from each aggregate appearing in the filter condition.
 For report aggregates having a standard aggregate counterpart (MIN, MAX, SUM, AVG, COUNT, and COUNT (*)), the group is derived from the FOR clause.
 For all other aggregates, the group is derived from the AT clause.
 For non-aggregate filter conditions, the group is derived from the detail column references.

To determine how to perform the transformation (42), all enumerated groups are compared to determine an overall grouping level. If all groups are compatible, the group with the lowest level of granularity (group with the most columns) is chosen as the overall filter group. For instance, if the enumerated groups are (SNO), and (SNO, PNO), the filter group is (SNO, PNO). If the groups are not compatible, the filter group is NULL, and no optimization can be performed.

Some examples are given in the following table:

| FILTER Condition | FILTER Group |
|---|---|
| SUM(QTY) OVER (PARTITION BY SNO) > 100 | (SNO) |
| SUM(QTY) OVER (PARTITION BY SNO, PNO) > AVG(QTY) OVER (PARTITION BY SNO) | (SNO, PNO) |

| FILTER Condition | FILTER Group |
|---|---|
| RANK( ) OVER (PARTITION BY SNO ORDER BY QTY)* AVG(QTY) OVER (PARTITION BY SNO) > 100 | NULL |
| RANK( ) OVER (AT SNO, PNO, JNO ORDER BY QTY)* SUM(QTY) OVER (PARTITION BY SNO) > 100 | (SNO, PNO, JNO) |
| SUM(QTY) OVER (PARTITION BY SNO) > SUM(QTY) OVER (PARTITION BY PNO) | NULL |
| SNO > 'S2' | (SNO) |

If no optimization can be performed, a simple transformation is performed. Otherwise, aggregates in the select list are analyzed and replaced with equivalent expressions in an effort to avoid introducing detail information into the inner select. This might involve replacing the aggregate all together, or replacing the aggregate operand with another aggregate (a nested aggregate) computed at the same level as the FILTER group.

The basic steps in performing the transformation are as follows:

1. Construct a derived table (44).
2. Traverse the select list of the original query, performing the following actions (45):
   a. Move PREFILTER aggregates and aggregates with a grouping level that matches the grouping level of the FILTER condition into the derived table.
   b. For aggregates MIN, MAX, and SUM, the replace the operand with an aggregate computed at the same level as the FILTER group, and an AT clause is introduced to eliminate duplicates values from the computation.
   c. Replace AVG with an equivalent expression involving SUM and COUNT.
   d. Replace COUNT and COUNT(*) with equivalent SUM aggregate expressions.
3. Traverse the FILTER condition, moving detail columns and aggregates into the select list of the derived table (46).

Assuming the FILTER group is (SNO, PNO), the action taken for various aggregates is described below:

SUM(QTY) OVER (PARTITION BY SNO)

Replace with XSUM(C1 AT SNO, PNO FOR SNO), where C1=XSUM(QTY FOR SNO, PNO) and add C1 to the inner select.

AVG(QTY) OVER ( )

Replace with XSUM (C1 AT SNO, PNO)/XSUM (C2 AT SNO, PNO), where C1=SUM(QTY) OVER (PARTITION BY SNO, PNO), C2=COUNT(QTY) OVER (PARTITION BY SNO, PNO), and add C1 and C2 to the inner select.

MAX(QTY) OVER (PARTITION BY SNO, PNO)

Move the aggregate into inner select, since it is computed at the same level as the FILTER group.

COUNT(QTY) OVER (PARTITION BY SNO)

Replace with SUM(C1) OVER (AT SNO, PNO PARTITION BY SNO), where C1=COUNT(QTY) OVER (PARTITION BY SNO, PNO), and add C1 to the inner select.

The following examples are provided to illustrate the functionality of the summary filter transformation system (20) and methods (30), (40):

Example 1

In this example, a simple summary filter is illustrated.

| Original Query | |
|---|---|
| SELECT | SNO, PNO, |
| | SUM( QTY ) OVER ( PARTITION BY SNO ), |
| | SUM( QTY ) OVER ( PARTITION BY SNO, PNO ) |
| FROM | SUPPLY |
| FILTER | SUM( QTY ) OVER ( PARTITION BY SNO, PNO ) > 100 |
| Transformed Query | |
| SELECT | T1.C0, T1.C1, |
| | SUM( T1.C2 ) OVER ( AT T1.C0, T1.C1 PARTITION BY T1.C0 ), T1.C2 |
| FROM ( | SELECT SNO C0, PNO C1, |
| | SUM( QTY ) OVER ( PARTITION BY SNO, PNO ) C2 |
| | FROM SUPPLY ) T1 |
| WHERE | T1.C2 > 100 |

Explanation

The FILTER condition is first analyzed, and the group is determined to be (SNO, PNO). A derived table is then constructed whose select list contains the required detail information (SNO, PNO) and the aggregate appearing in the condition. The first SUM in the main select list is computed based on the SUM in the derived table. Since it's group is (SNO), an AT clause is added to its specification to eliminated double counting. The second SUM is identical to the SUM in the derived table, so it is replaced accordingly.

Example 2

In this example, use of the PREFILTER keyword in an OLAP function is illustrated.

| Original Query | |
|---|---|
| SELECT | SNO, PNO, |
| | SUM( QTY ) OVER ( PARTITION BY SNO ), |
| | SUM( QTY ) OVER ( PARTITION BY PNO PREFILTER ) |
| FROM | SUPPLY |
| FILTER | SUM( QTY ) OVER ( PARTITION BY SNO, PNO ) > 100 |
| Trasformed Query | |
| SELECT | T1.C0, T1.C1, |
| | SUM( T1.C2 ) OVER ( AT T1.C0, T1.C1 PARTITION BY T1.C0 ), T1.C3 |
| FROM ( | SELECT SNO C0, PNO C1, |
| | SUM( QTY ) OVER ( PARTITION BY SNO, PNO ) C2, |
| | SUM( QTY ) OVER ( PARTITION BY PNO ) C3 |
| | FROM SUPPLY ) T1 |
| WHERE | T1.C2 > 100 |

After applying the GROUP query transformation on the derived table, the query becomes:

| SELECT | T1.C0, T1.C1, |
|---|---|
| | SUM( T1.C2 ) OVER ( AT T1.C0, T1.C1 PARTITION BY T1.C0 ), T0.C1 |
| FROM ( | SELECT T2.C0 C0, T2.C1 C1, T1.C2 C2, T0.C1 C3 |
| | FROM ( SELECT PNO C0, SUM( QTY ) C1 |
| | FROM SUPPLY |
| | GROUP BY PNO ) T0, |

-continued

```
            ( SELECT   SNO C0, PNO C1, SUM( QTY ) C2
              FROM     SUPPLY
              GROUP    BY SNO, PNO) T1,
            ( SELECT   SNO C0, PNO C1
              FROM     SUPPLY ) T2
       WHERE    T2.C0 = T1.C0 OR ( T2.C0 IS NULL AND
                T1.C0 IS NULL )
       AND      T2.C1 = T1.C1 OR ( T2.C1 IS NULL AND
                T1.C1 IS NULL )
       AND      T2.C1 = T0.C0 OR ( T2.C1 IS NULL AND
                T0.C0 IS NULL ) ) T1
WHERE   T1.C3 > 100
```

Explanation

The FILTER condition is first analyzed, and the group is determined to be (SNO, PNO). A derived table is then constructed whose select list contains the required detail information (SNO, PNO) and the aggregate appearing in the condition. The first SUM in the main select list is computed based on the SUM in the derived table. Since it's group is (SNO), an AT clause is added to its specification to eliminated double counting. The second SUM has a group of (PNO), which does not match the group of the FILTER condition, but The PRE-FILTER keyword is specified, so it is moved into the derived table.

Example 3

In this example, the effect the presence of the AVG function has on the transformation is illustrated.

| Original Query |
| --- |

```
SELECT   SNO, PNO,
         MAX( QTY ) OVER ( PARTITION BY SNO, PNO ),
         AVG( QTY ) OVER ( )
FROM     SUPPLY
FILTER   SUM( QTY ) OVER ( PARTITION BY SNO, PNO ) > 100
```
Transformed Query

```
SELECT   T1.C0, T1.C1, T1.C2,
         SUM( T1.C3 ) OVER ( AT T1.C0, T1.C1 ) /
           SUM( T1.C4 ) OVER ( AT T1.C0, T1.C1 )
FROM (   SELECT   SNO C0, PNO C1,
                  MAX( QTY ) OVER ( PARTITION BY SNO,
                  PNO ) C2,
                  SUM( QTY ) OVER ( PARTITION BY SNO,
                  PNO ) C3,
                  COUNT( QTY ) OVER ( PARTITION BY SNO,
                  PNO ) C4
         FROM     SUPPLY ) T1
WHERE    T1.C3 > 100
```

After applying the GROUP query transformation on the derived table, the query, becomes:

```
SELECT   T1.C0, T1.C1, T1.C2,
         SUM( T1.C3 ) OVER ( AT T1.C0, T1.C1 ) /
           SUM( T1.C4 ) OVER ( AT T1.C0, T1.C1 )
FROM (   SELECT   T1.C0 C0, T1.C1 C1, T0.C2 C2,T0.C3 C3,
                  T0.C4 C4
         FROM (   SELECT   SNO C0, PNO C1, MAX( QTY ) C2,
                           SUM( QTY ) C3,
                           COUNT( QTY ) C4
                  FROM     SUPPLY
                  GROUP    BY SNO, PNO ) T0,
                ( SELECT   SNO C0, PNO C1
                  FROM     SUPPLY ) T1
         WHERE    T1.C0 = T0.C0 OR ( T1.C0 IS NULL AND
                  T0.C0 IS NULL )
         AND      T1.C1 = T0.C1 OR ( T1.C1 IS NULL AND
                  T0.C1 IS NULL ) ) T1
WHERE    T1.C3 > 100
```

Explanation

The FILTER condition is first analyzed, and the group is determined to be (SNO, PNO). A derived table is then constructed whose select list contains the required detail information (SNO, PNO) and the aggregate appearing in the condition. The MAX function has a group of (SNO, PNO) which matches the group of the FILTER condition, so it is added to the derived table. The AVG function has a group of ( ), which does not match the group of the FILTER condition, so it must be replaced by an expression that involves aggregates computed at the same grouping level as the FILTER condition. Hence, a SUM and COUNT aggregate are added to the derived table, and the AVG function is replaced. The AT clauses in the two SUM function in the outer select eliminate double counting.

Example 4

In this example, the effect the presence of the DISTINCT keyword has on the transformation is illustrated.

| Original Query |
| --- |

```
SELECT   DISTINCT SNO, PNO,
         SUM( QTY ) OVER ( PARTITION BY SNO ),
         SUM( QTY ) OVER ( PARTITION BY SNO, PNO )
FROM     SUPPLY
FILTER   SUM( QTY ) OVER ( PARTITION BY SNO, PNO ) > 100
```
Transformed Query

```
SELECT   T1.C0, T1.C1, SUM( T1.C2 ) OVER ( PARTITION BY
         T1.C0 ), T1.C2
FROM (   SELECT   SNO C0, PNO C1, SUM( QTY ) C2
         FROM     SUPPLY
         GROUP    BY SNO, PNO ) T1
WHERE    T1.C2 > 100
```

The query above can then be reformulated as follows:

```
SELECT   T1.C0, T1.C1, SUM( T1.C2 ) OVER ( PARTITION BY
         T1.C0 ), T1.C2
FROM (   SELECT   SNO C0, PNO C1, SUM( QTY ) C2
         FROM     SUPPLY
         GROUP    BY SNO, PNO
         HAVING   SUM( QTY ) > 100 ) T1
```

Explanation

The FILTER condition is first analyzed, and the group is determined to be (SNO, PNO). A derived table is then constructed whose select list contains the required detail information (SNO, PNO) and the aggregate appearing in the condition. Because of the presence of the DISTINCT keyword, and the fact that the detail information required are columns in the FILTER condition group; a GROUP BY can be introduced into the derived table. The first SUM can be computed based on the SUM in the derived table—no AT clause is required since the GROUP BY eliminates the possibility of duplicates. The second SUM is the same as the SUM in the derived table, so it is replaced accordingly. Finally, the DIS- TINCT keyword can be eliminated since the GROUP BY inside the derived table ensures that there will be no duplicate rows.

The systems and methods according to the present invention may be implemented by any hardware, software or a combination of hardware and software having the functions described above. The software code, either in its entirety or a part thereof; may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A method, in a data processing system having a processor, of summary filter query transformation, the method comprising:
   receiving, in a summary filter transformation system of the data processing system, a query having a select list, a from element, and a summary filter having a filter condition;
   analyzing, by an analysis module of the summary filter transformation system, the filter condition to determine a filter group of the filter condition, the filter group comprising a list of expressions over which the filter condition is computed;
   creating, by the analysis module, a derived table for computing the filter condition, the derived table having a select list, creating the derived table comprising:
      adding the list of expressions of the filter group to the derived table as one or more columns of the derived table's select list; and
      adding the filter condition to the derived table as a one or more columns of the derived table's select list;
   transforming, by a transformation module of the summary filter transformation system, the received query by combining the received query with the derived table, transforming the received query comprising:
      traversing the select list of the received query and transforming one or more aggregates of the select list to reference one or more of the columns of the derived table;
      transforming the from element of the received query to reference the derived table; and
      adding a WHERE clause to the transformed original query, the WHERE clause based on the filter condition and referencing one or more of the columns of the derived table.

2. The method as claimed in claim 1, wherein creating the derived table further comprises:
   identifying aggregates in the select list of the received query having a PREFILTER clause;
   adding the identified PREFILTER aggregates from the select list of the received query to the select list of the derived table; and
   replacing the PREFILTER aggregates in the select list of the received query with a reference to the added PREFILTER aggregate in the derived table.

3. The method as claimed in claim 1, wherein analyzing the filter condition to determine the filter group comprises:
   identifying aggregates of the filter condition;
   for each identified aggregate, identifying an aggregate group of the aggregate, the aggregate group comprising a list of expressions over which the aggregate is computed; and
   selecting the aggregate group with the lowest level of granularity as the filter group.

4. The method as claimed in claim 3, wherein identifying an aggregate group comprises:
   determining the type of the aggregate;
   when the aggregate is a report aggregate having a standard aggregate counterpart, deriving the aggregate group based on a FOR clause of the aggregate; and
   when the aggregate is a non-report aggregate, deriving the aggregate group based on an AT clause of the aggregate.

5. The method as claimed in claim 3, wherein the standard aggregates comprise at least one of:
   MIN;
   MAX;
   SUM;
   AVG;
   COUNT; or
   COUNT(*).

6. The method as claimed in claim 1, further comprising determining that the FILTER transformation can be performed, comprising:
   determining an aggregate group for each aggregate of the filter condition; and
   determining that all of the determined aggregate groups are compatible, including:
      determining the aggregate group with the lowest level of granularity;
      determining that each aggregate group is a subset of the aggregate group with the lowest level of granularity or that each aggregate group is identical to the aggregate group with the lowest level of granularity.

7. A data processing system, comprising:
   a query engine; and
   a summary filter transformation system coupled to the query engine, wherein the summary filter transformation system is configured to:
   receive a query having a select list, a from element, and a summary filter having a filter condition;
   analyze the filter condition to determine a filter group of the filter condition, the filter group comprising a list of expressions over which the filter condition is computed;
   create a derived table for computing the filter condition, the derived table having a select list, creating the derived table comprising:
      adding the list of expressions of the filter group to the derived table as one or more columns of the derived table's select list; and
      adding the filter condition to the derived table as a one or more columns of the derived table's select list;
   transform the received query by combining the received query with the derived table, transforming the received query comprising:
      traverse the select list of the received query and transforming one or more aggregates of the select list to reference one or more of the columns of the derived table;
      transform the from element of the received query to reference the derived table; and add a WHERE clause to the transformed original query, the WHERE clause based on the filter condition and referencing one or more of the columns of the derived table.

8. The data processing system as claimed in claim 7, wherein the summary filter transformation system is configured to create the derived table further by:
identifying aggregates in the select list of the received query having a PREFILTER clause;
adding the identified PREFILTER aggregates from the select list of the received query to the select list of the derived table; and
replacing the PREFILTER aggregates in the select list of the received query with a reference to the added PREFILTER aggregate in the derived table.

9. The data processing system as claimed in claim 7, wherein the summary filter transformation system is configured to analyze the filter condition to determine the filter group by:
identifying aggregates of the filter condition;
for each identified aggregate, identifying an aggregate group of the aggregate, the aggregate group comprising a list of expressions over which the aggregate is computed; and
selecting the aggregate group with the lowest level of granularity as the filter group.

10. The data processing system as claimed in claim 9, wherein the summary filter transformation system is configured to identify an aggregate group by:
determining the type of the aggregate;
when the aggregate is a report aggregate having a standard aggregate counterpart, deriving the aggregate group based on a FOR clause of the aggregate; and
when the aggregate is a non-report aggregate, deriving the aggregate group based on an AT clause of the aggregate.

11. The data processing system as claimed in claim 9, wherein the standard aggregates comprise at least one of:
MIN;
MAX;
SUM;
AVG;
COUNT; or
COUNT(*).

12. The data processing system as claimed in claim 7, wherein the summary filter transformation system is further configured to determine that the FILTER transformation can be performed, comprising:
determining an aggregate group for each aggregate of the filter condition; and
determining that all of the determined aggregate groups are compatible, including:
determining the aggregate group with the lowest level of granularity; and
determining that each aggregate group is a subset of the aggregate group with the lowest level of granularity or that each aggregate group is identical to the aggregate group with the lowest level of granularity.

13. A computer program product comprising a non-transitory computer-readable medium further comprising:
computer-readable code for receiving a query having a select list, a from element, and a summary filter having a filter condition;
computer-readable code for analyzing the filter condition to determine a filter group of the filter condition, the filter group comprising a list of expressions over which the filter condition is computed;
computer-readable code for creating a derived table for computing the filter condition, the derived table having a select list, creating the derived table comprising:
adding the list of expressions of the filter group to the derived table as one or more columns of the derived table's select list; and
adding the filter condition to the derived table as a one or more columns of the derived table's select list;
computer-readable code for transforming the received query by combining the received query with the derived table, transforming the received query comprising:
traversing the select list of the received query and transforming one or more aggregates of the select list to reference one or more of the columns of the derived table;
transforming the from element of the received query to reference the derived table; and
adding a WHERE clause to the transformed original query, the WHERE clause based on the filter condition and referencing one or more of the columns of the derived table.

14. The computer program product as claimed in claim 13, the creating the derived table further comprising:
identifying aggregates in the select list of the received query having PREFILTER clause;
adding the identified PREFILTER aggregates from the select list of the received query to the select list of the derived table; and
replacing the PREFILTER aggregates in the select list of the received query with a reference to the added PREFILTER aggregate in the derived table.

15. The computer program product as claimed in claim 13, the analyzing the filter condition to determine the filter group further comprising:
identifying aggregates of the filter condition;
for each identified aggregate, identifying an aggregate group of the aggregate, the aggregate group comprising a list of expressions over which the aggregate is computed; and
selecting the aggregate group with the lowest level of granularity as the filter group.

16. The computer program product as claimed in claim 15, the identifying an aggregate group further comprising:
determining the type of the aggregate;
when the aggregate is a report aggregate having a standard aggregate counterpart, deriving the aggregate group based on a FOR clause of the aggregate; and
when the aggregate is a non-report aggregate, deriving the aggregate group based on an AT clause of the aggregate.

17. The computer program product as claimed in claim 15, wherein the standard aggregates comprise at least one of:
MIN;
MAX;
SUM;
AVG;
COUNT; or
COUNT(*).

18. The computer program product as claimed in claim 13, further comprising computer-readable code for determining that the FILTER transformation can be performed, determining further comprising:
determining an aggregate group for each aggregate of the filter condition; and
determining that all of the determined aggregate groups are compatible, including:
determining the aggregate group with the lowest level of granularity; and determining that each aggregate group is a subset of the aggregate group with the lowest level of granularity or that each aggregate group is identical to the aggregate group with the lowest level of granularity.

* * * * *